(12) United States Patent
Baker et al.

(10) Patent No.: US 6,459,725 B1
(45) Date of Patent: Oct. 1, 2002

(54) WIRELESS REPEATER WITH IMPROVED DIVERSITY

(75) Inventors: Kenneth R. Baker, Boulder, CO (US); Richard Dean, Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/126,694

(22) Filed: Jul. 31, 1998

(51) Int. Cl.[7] .................. H03K 11/00; H04L 25/60; H04L 25/64
(52) U.S. Cl. .................. 375/214; 375/211; 370/315; 370/320; 370/323; 370/326
(58) Field of Search ................. 375/214, 211, 375/219, 220, 347, 141; 370/315, 316, 320, 321, 323, 325, 326, 334

(56) References Cited

U.S. PATENT DOCUMENTS

| | | | |
|---|---|---|---|
| 4,494,077 A | | 1/1985 | Fukaya et al. .............. 330/295 |
| 4,589,032 A | | 5/1986 | Morey ........................ 358/242 |
| 4,596,957 A | | 6/1986 | Fukaya et al. .............. 330/252 |
| 4,663,768 A | * | 5/1987 | Ryu ............................ 375/100 |
| 4,901,307 A | | 2/1990 | Gilhousen et al. ........... 370/18 |
| 4,933,642 A | | 6/1990 | Lee ............................... 330/9 |
| 5,203,023 A | * | 4/1993 | Saito et al. .................. 455/133 |
| 5,513,176 A | | 4/1996 | Dean et al. ................... 370/18 |
| 5,533,011 A | | 7/1996 | Dean et al. ................... 370/18 |
| 5,577,265 A | | 11/1996 | Wheatley, III ............. 455/33.3 |
| 5,602,834 A | | 2/1997 | Dean et al. .................. 370/335 |
| 5,654,880 A | | 8/1997 | Brkovic et al. ............... 363/17 |
| 6,125,109 A | * | 9/2000 | Fuerter ........................ 370/315 |

* cited by examiner

Primary Examiner—Mohammad H. Ghayour
(74) Attorney, Agent, or Firm—Philip R. Wadsworth; Charles D. Brown; George C. Pappas

(57) ABSTRACT

The invention includes methods and systems for use in a wireless communications system, such as a CDMA mobile communications system. A communications device transmits a wireless signal. A repeater system receives a first version of the wireless signal using a first receiver system and receives a second version of the wireless signal using a second receiver system. The repeater system switches between the first version of the wireless signal and the second version of the wireless signal to generate a third version of the wireless signal. The repeater system transmits the third version of the wireless signal and a base station system receives the third version of the wireless signal. In some embodiments of the invention, the wireless signals are Code Division Multiple Access (CDMA) signals. In some embodiments of the invention, the switching occurs at a rate of 4 MHz.

19 Claims, 8 Drawing Sheets

WIRELESS REPEATER WITH IMPROVED DIVERSITY

BACKGROUND OF THE INVENTION

I. Field of the Invention

The present invention relates to the field of wireless communications. More particularly, the present invention relates to a novel and improved system for using switching in the repeater to improve diversity between a repeater and a base station.

II. Description of the Related Art

Wireless communication entails the transmission of electromagnetic waves through free space. In a wireless communications system, a base station receives a wireless signal from a communications device, such as a mobile phone. Some base: stations receive diverse versions of the wireless signal by using two antennas. This technique is referred to as receive diversity. Receive diversity improves system performance because one version of the signal may still be available if the other version of the signal fades.

A wireless repeater is sometimes used between the communications device and the base station. The repeater extends the range of the base station by amplifying and re-transmitting the wireless signal between the communications device and the base station. Some repeaters also use receive diversity by receiving two versions of the wireless signal from the communications device. The repeater sums the two versions into a combined signal and transmits the combined wireless signal to the base station.

The current repeater solution is lacking. The summing of the two versions of the wireless signal in the repeater degrades the Signal-to-Noise Ratio (SNR) by at least three decibels in the low SNR conditions. If the transmitter in the repeater malfunctions, then the wireless signal to the base station may be defective or lost. If the wireless signal to the base station experiences significant fading, then the base station cannot retrieve the user information from the wireless signal. In either case, the functionality of the repeater is lost.

Multipath wireless signals are different versions of the same wireless signal that are generated by reflections from structures and natural formations. Multipath signals can have phase shifts that cause the signals to cancel each other out at certain locations. The loss of a signal due to the phase cancellation of multipath signals is known as fading. Fading is a serious problem in wireless systems because it disrupts user communications.

The loss of diversity in the repeater has an impact on wireless systems that use Code Division Multiple Access (CDMA). One form of CDMA is specified in the IS-95 standard approved by the Telecommunications Industry Association, but the invention is not restricted to the form of CDMA specified in this particular standard. CDMA systems transmit and receive wireless signals within a single frequency band and use codes to separate the individual signals. In contrast, other systems use frequency and time division to separate the individual signals. CDMA systems have demonstrated clear advantages in the areas of capacity, voice quality, privacy, and cell hand-off.

CDMA systems require power control. The SNR represents the power of a signal relative to the surrounding noise. An adequate SNR must be maintained so that the signal can be separated from the noise. Since CDMA signals are not divided by frequency or time for a given link direction, the noise component of the ratio includes all other received CDMA signals. If the power of an individual. CDMA signal is too high, it effectively drowns out all other CDMA signals. Thus, power control is used to maintain an equivalent power level for all user signals received at the base station. The power level of these received CDMA signals should be minimized, but still must be strong enough to maintain the appropriate SNR. CDMA systems dynamically control the transmit power of each communications device to maintain the appropriate power level of the received signals at the base station. Dynamic control is applied through open loop and closed loop control techniques that are known in the industry.

The range of the CDMA system is directly related to the common power level of the received signals because each additional signal adds noise to all of the other signals. The user noise component of the SNR is reduced when the average receive power level is lowered. Techniques that decrease CDMA signal power from the communications device directly increase the range of the CDMA system. Receive diversity is one technique used to minimize the required signal power. Lower signal power also lowers the cost of the user communications devices while increasing operational battery life as well as the range.

Diversity improves the reliability and capacity of a CDMA system. Diversity also reduces the signal power required to overcome fading. Prior CDMA systems have used receive diversity at the repeater and base stations. Unfortunately, much of the diversity improvement is lost in the repeater because the diverse versions of the signal are summed. This loss of diversity increases the signal power requirement of the communications device and decreases the range of the CDMA system.

The performance of a wireless communications system could be improved if the diversity between the repeater and the base station is enhanced. For CDMA systems, the range and capacity of the systems can be increased if the signal power can be reduced through improved diversity.

SUMMARY OF THE INVENTION

The present invention is a novel and improved system The invention solves the problems discussed above by adding a switching capability in the wireless repeater that provides additional diversity between the repeater and the base station. The repeater does not sum the diverse versions of the wireless signal received by the repeater, but switches between the diverse versions to generate a composite version of the wireless signal. The repeater transmits the composite version of the wireless signal to the base station.

The improved diversity provided by the composite signal increases the reliability of the system. In addition, the, repeater does not incur the three-decibel SNR loss because it does not sum the diverse versions of the wireless signal. Lower SNR increases the capacity and range of wireless base stations that use CDMA. Reduced signal power lowers the cost of the user communications devices while increasing operational battery life and range.

The invention does not require diverse transmitters or power amplifiers in the repeater. The invention does not require special equipment to transmit and receive wireless signals using different polarizations. This reduces the cost of the system. It also makes the system operational in areas where the base station does not have equipment to receive wireless signals using different polarizations.

The invention includes methods and systems for use in a wireless communications system where a communications device transmits a wireless signal. A repeater system receives a first version of the wireless signal using a first receiver system and receives a second version of the wireless signal using a second receiver system. The repeater system switches between the first version of the wireless signal and the second version of the wireless signal to generate a third version of the wireless signal. The repeater system transmits the third version of the wireless signal. A base station system receives the third version of the wireless signal. In some embodiments of the invention, the wireless signal is a Code Division Multiple Access (CDMA) signal. For CDMA communications over an air interface, the switching should occur several times per chip period, such as 4 MHz.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Underlying Technology—FIGS. 1–4

Figure 1:
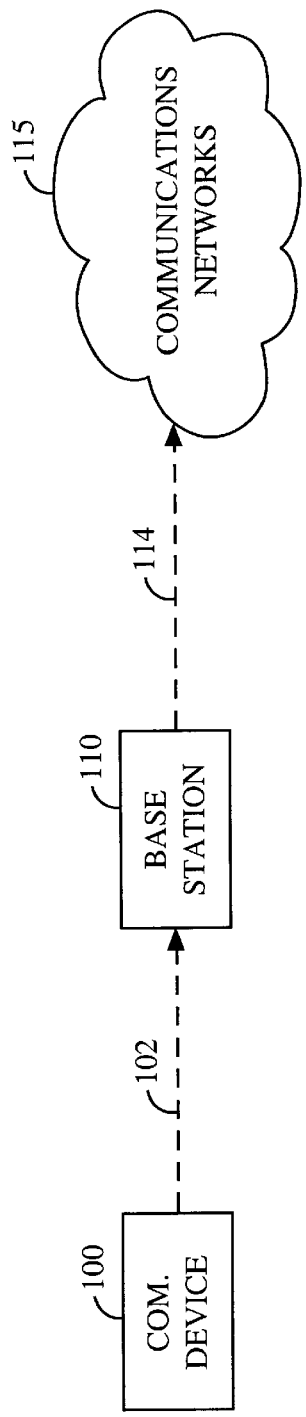
FIG. 1 is a block diagram of a conventional wireless system with a base station.

FIG. 1 depicts a basic wireless system that is known in the art. A communications device 100, such as a wireless telephone or a wireless data terminal, transmits a wireless signal 102 containing user information to a base station 110. The base station 110 processes the wireless signal 102 and transmits a signal 114 that is based on the wireless signal 102 to communications networks 115.

The communications link from the communications device 100 to the base station system 110 is referred to as the reverse link. The communications link from the base station system 110 to the communications device 100 is referred to as the forward link. Communications occur on the forward link in a reciprocal fashion from the communications networks 115 to the communications device 100 through the base station 110.

In a typical system, several base stations are deployed to allow numerous mobile users to communicate with the base stations as they travel. The communications networks 115 would typically include a base station controller or similar device that exchanges communications with multiple base stations. Examples of the communications networks 115 include public switched networks, wireless networks, satellite networks, long distance telephone networks, local telephone networks, and the Internet.

Figure 2:
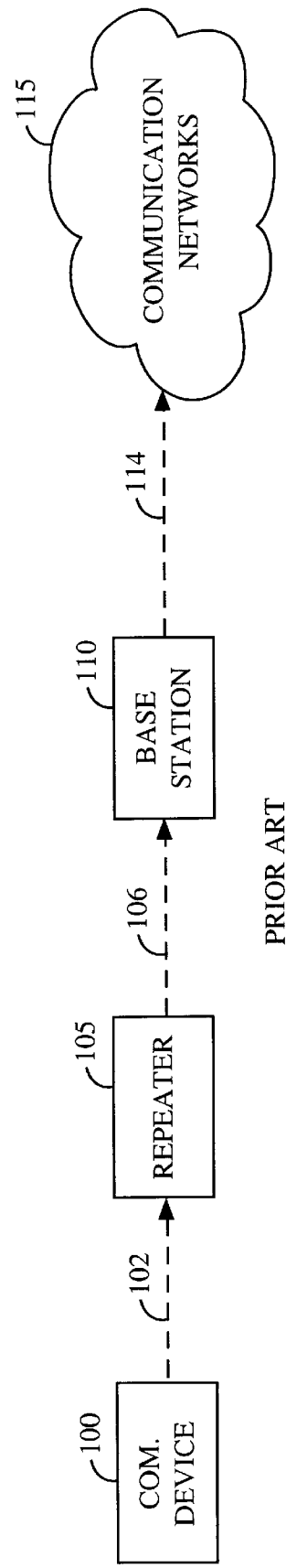
FIG. 2 is a block diagram of a conventional wireless system with a repeater and a base station.

FIG. 2 depicts the system of FIG. 1 with a repeater 105 added in between the communications device 100 and the base station 110. The repeater 105 receives the wireless signal 102. The repeater 105 amplifies the received signal and transmits a wireless signal 106 that is based on the amplified signal to the base station 110. The repeater 105 extends the range of the base station 110. Although not shown, the base station 110 would typically receive wireless signals from other communications devices without using the repeater 105.

Figure 3:
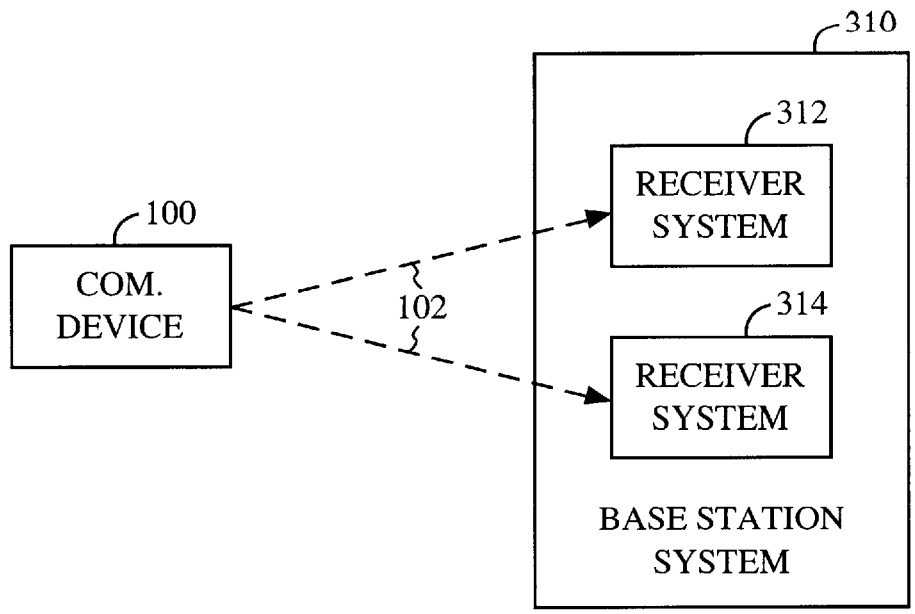
FIG. 3 is a block diagram of a conventional wireless system with receive diversity at the base station.

FIG. 3 depicts the current use of receive diversity at a base station 310. The communications device 100 transmits the wireless signal 102 to a base station 310. The wireless signal 102 is shown as two dashed lines for clarity, but those skilled in the art are aware that wireless signals typically propagate in a directional or omni-directional manner. The dashed lines represent the versions of the wireless signal 102 that are received by the base station 310. The base station 310 includes a first receiver system 312 and a second receiver system 314. The receiver systems 312 and 314 each receive a version of the wireless signal 102 from the communications device 100. Typically, the versions of the wireless signal 102 are different due to the different physical path taken by each version, and each version is comprised of related multi-path copies. The base station 310 processes the versions of the wireless signal and transfers the resulting communications signal 114 to the communications networks 115.

Figure 4:
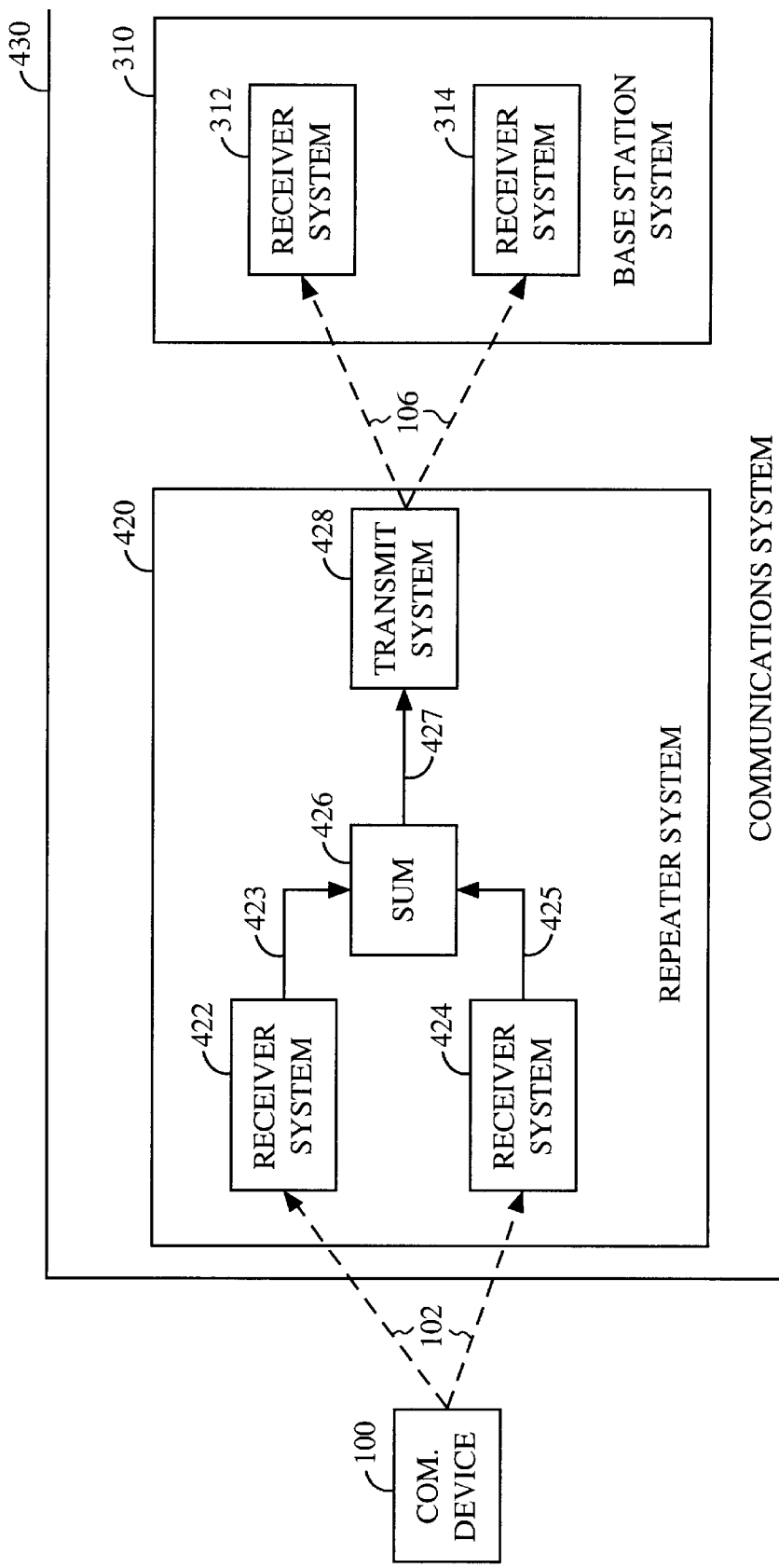
FIG. 4 is a block diagram of a conventional wireless system with receive diversity at the repeater.

FIG. 4 depicts the current use of receive. diversity at a repeater system 420 and the base station 310. The communications device 100 transmits the wireless signal 102 to the repeater system 420. The repeater system 420 uses a receiver system 422 to receive a version 423 of the wireless signal 102 and uses a receiver system 424 to receive a version 425 of the wireless signal 102. The receiver systems 422 and 424 transfer the versions 423 and 425 of the wireless signal 102 to a summing circuit 426. The summing circuit 426 sums the versions 423 and 425 to create a resulting signal 427 that is provided to the transmitter system 428. The transmitter system 428 transmits a wireless signal 106 that is based on the resulting signal 427. The summing circuit 426 can cause a three-decibel loss in the SNR of the resulting signal 427 if the receiver systems 422 and 424 have enough gain.

The base station 310 uses the receiver system 312 and the receiver system 314 to receive two versions of the wireless signal 106. The base station 310 processes the versions of the wireless signal 106 to generate a resulting communications signal with the user information in the wireless signal 102. It should be noted that the technique of summing the versions 423 and 425 loses much of the diversity attained. by the repeater system 420.

Figure 5:
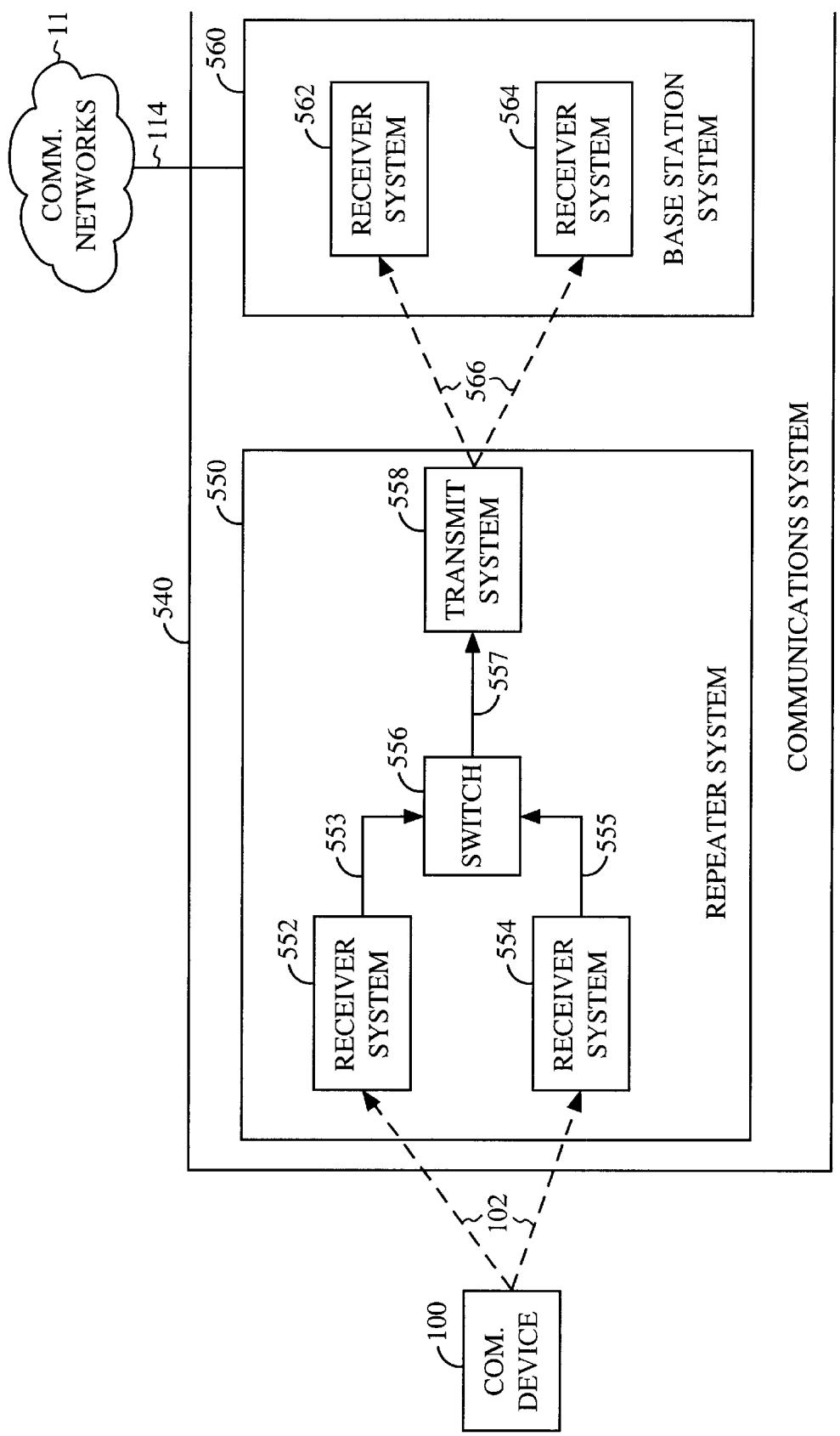
FIG. 5 is a block diagram of a communications system in an embodiment of the invention.

System Configuration and Operation—FIG. 5

FIG. 5 depicts a wireless communications system 540 that is configured and operates in accord with the present invention. The communications device 100 transmits the wireless signal 102 containing user information to the wireless communications system 540. The wireless communications system 540 transfers the communications signal 114 containing the user information to the communications networks 115. The wireless communications system 540 is comprised of a wireless repeater system 550 and a wireless base station system 560. In some embodiments, the wireless communications system 540 uses CDMA.

The communications device 100 could be any device that transmits wireless signals. An example of the communications device 100 is the Q-1900 provided by Qualcomm, Inc. of San Diego, Calif.

The wireless repeater system 550 is comprised of a receiver system 552, a receiver system 554, a switch 556, and a transmitter system 558. The meaning of the term "repeater" varies, but in the context of the invention, the term "repeater" means a system that receives, amplifies, and retransmits a wireless signal without extracting the user information or converting the communications protocol. For example, a CDMA base station receives and decodes CDMA signals to extract user information. The CDMA base station then transmits another signal with the extracted user information. The CDMA base station may use a different protocol, such as a T1, to transmit the other signal. In contrast, a "repeater" does not decode CDMA signals to extract user information and does not change signal protocols. The repeater system 550 could be adapted by those skilled in the art from the model CDR 1901 provided by Ortel, Inc. of Alhambra, Calif.

The base station system 560 is comprised of a receiver system 562 and a receiver system 564. The base station system 560 receives and processes the version 566 and transfers the resulting communications signal 114 to the communications networks 115. Such processing typically includes down-conversion, demodulation, and decoding. An example of the base station system is the model 519e provided by Qualcomm, Inc. of San Diego, Calif.

In operation, the communications device 100 transmits the wireless signal 102 to the repeater system 550. The repeater system 550 receives a version 553 of the wireless signal 102 using the receiver system 552. The repeater system 550 also receives a version 555 of the wireless signal 102 using the receiver system 554. The receiver system 552 provides the version 553 to a switch 556 and the receiver system 554 provides the version 555 to the switch 556. The switch 556 switches between the version 553 and the version 555 of the wireless signal 102. The switch 556 provides a composite version 557 of the wireless signal 102 to the transmitter system 558. The transmitter system 558 transmits the version 566 of the wireless signal 102 to the base station system 560. The version 566 is a wireless signal that is based on the composite version 557 of the wireless signal 102.

The base station system 560 receives the version 566 of the wireless signal 102 using the receiver systems 562 and 564. The invention does not require that both receiver systems 562 and 564 receive the version 566. The version 566 may be intentionally directed away from one of the receiver systems 562 and 564, or the version 566 may be disrupted by interference that prevents reception at one: of the receiver systems 562 or 564. The base station system 560 receives and processes the version 566 and transfers the resulting communications signal 114 to the communications networks 115. The communications signal 114 includes the user information transmitted in the wireless signal 102.

Figure 6:
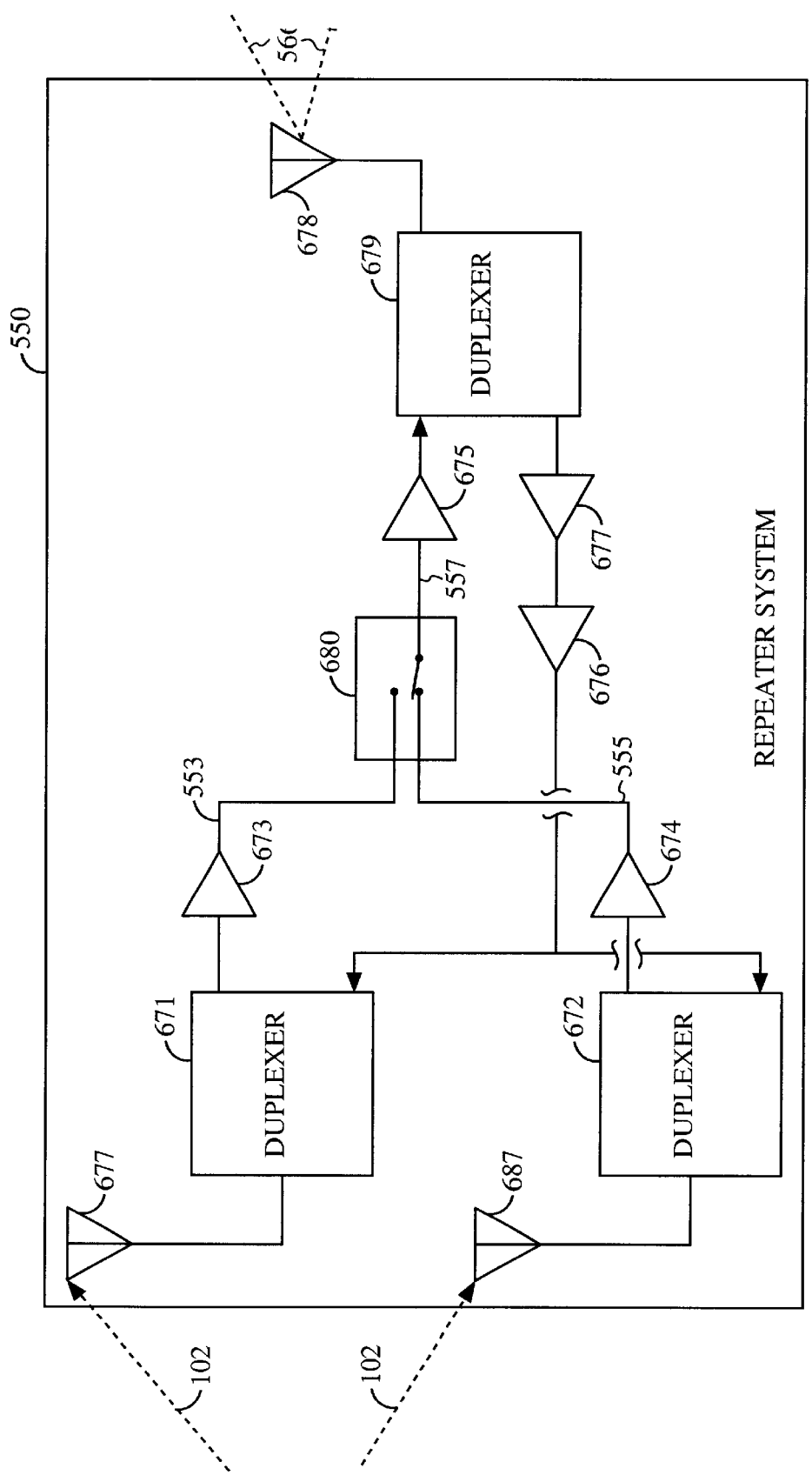
FIG. 6 is a block diagram of a repeater system in an embodiment of the invention.

The Repeater System—FIG. 6

FIG. 6 depicts the repeater system 550. The repeater system 550 is comprised of antennas 677, 678, and 687; duplexers 671, 672, and 679; low-noise amplifiers 673, 674, and 677; power amplifiers 675 and 676, and switch 680.

Those skilled in the art are aware that there are numerous other components and configurations that could be used for the repeater system of the present invention and that the invention is not restricted to the components and configuration depicted on FIG. 6. For example, modulation circuitry and a surface acoustic wave filter are typically used to convert the signal to an intermediate frequency and remove undesired out-of-band components before conversion back to the radio frequency for transmission. In addition, the output of amplifier 676 is shown as transferred to both duplexers, but may only be provided to one of the duplexers in some embodiments of the invention.

The antennas, duplexers, amplifiers, and switch that are shown on FIG. 6 are conventional components, although they have not been combined to operate in accord with the invention. The receiver system 552 of FIG. 5 could correspond to the antenna 677, the duplexer 671, and the low-noise amplifier 673. The receiver system 554 of FIG. 5 could correspond to the antenna 687, the duplexer 672, and the low-noise amplifier 674. The transmitter system 556 of FIG. 5 could correspond to the power amplifier 675, the duplexer 679, and the antenna 678. The versions 553, 555, and 557 of the wireless signal 102 from FIG. 5 are shown again on FIG. 6.

In operation, the antenna 677 receives the wireless signal 102 and transfers the received signal to the duplexer 671. The duplexer 671 transfers the received signal from the antenna 677 to the low-noise amplifier 673. The low-noise amplifier 673 amplifies the signal from the duplexer 671 and transfers the version 553 to the switch 680. The antenna 687 receives a version of the wireless signal 102 and transfers the received signal to the duplexer 672. The duplexer 672 transfers the received signal from the antenna 687 to the low-noise amplifier 674. The low-noise amplifier 674 amplifies the signal from the duplexer 672 and transfers the version 555 to the switch 680.

The switch 680 switches between the versions 553 and 555 to generate a composite version 557 of the versions 553 and 555 which are all versions of the wireless signal 102. The composite version 557 is passed from the switch 680 to the power amplifier 675. The power amplifier 675 amplifies the composite version 557 and transfers the amplified signal to the duplexer 679. The duplexer 679 transfers the amplified signal from the power amplifier 675 to the antenna 678 for transmission. The antenna 678 transmits the version 566 of the wireless signal 102. The version 566 is a wireless signal that is based on the composite version 557.

The above operation relates to the return link, and the repeater system 550 operates in a reciprocal fashion on the forward link for wireless signals that are received by the antenna 678 and that are transmitted by the antennas 677 and 687, except that switching is not required in some embodiments. Signals from the antenna 678 pass through the duplexer 679, the low-noise amplifier 677, the power amplifier 676, and then through both the duplexer 671 to reach the antenna 677, and the duplexer 672 to reach the antenna 687.

Figure 7:
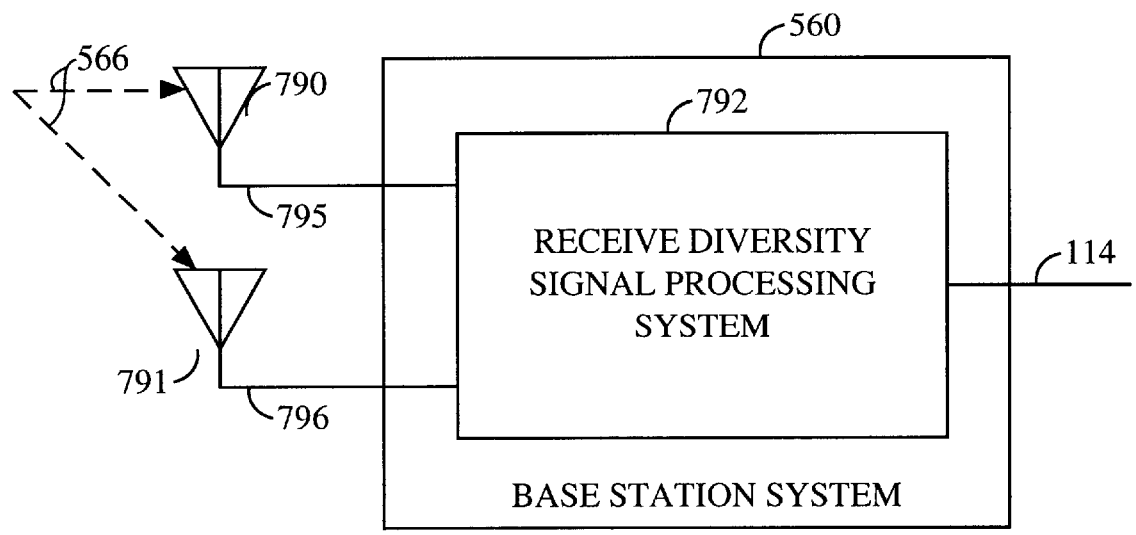
FIG. 7 is a block diagram of a base station system in an embodiment of the invention.

The Base Station System—FIG. 7

FIG. 7 depicts the base station system 560. The base station system 560 comprises an antenna 790, an antenna 791, and a receive diversity signal processing system 792. These components are conventional, but they have not been combined to operate in accord with the invention. Those skilled in the art are aware that there are numerous other components and configurations that could be used for the base station system of the present invention, and that the invention is not restricted to the components and configuration depicted on FIG. 7.

In operation, the antennas 790 and 791 typically both receive the version 566, although it is not required that both antennas receive the signal. For example, the version 566 may be intentionally directed away from the antenna 791, or may experience interference that prevents reception at the antenna 791. The antenna 790 provides a version 795 of the wireless signal 102 to the receive diversity signal processing system 792. The antenna 791 provides a version 796 of the wireless signal 102 to the receive diversity signal processing system 792. Both versions 795 and 796 are based on the version 566.

The receive diversity signal processing system 792 processes the versions 795 and 796 from the antennas 790 and 791 to provide a resulting communications signal 114. Such processing includes conventional techniques for digitization, down-conversion, and demodulation that may include decoding, de-multiplexing, or filtering. The communications signal 114 includes the user information carried in the originally transmitted wireless signal 102.

Figure 8:
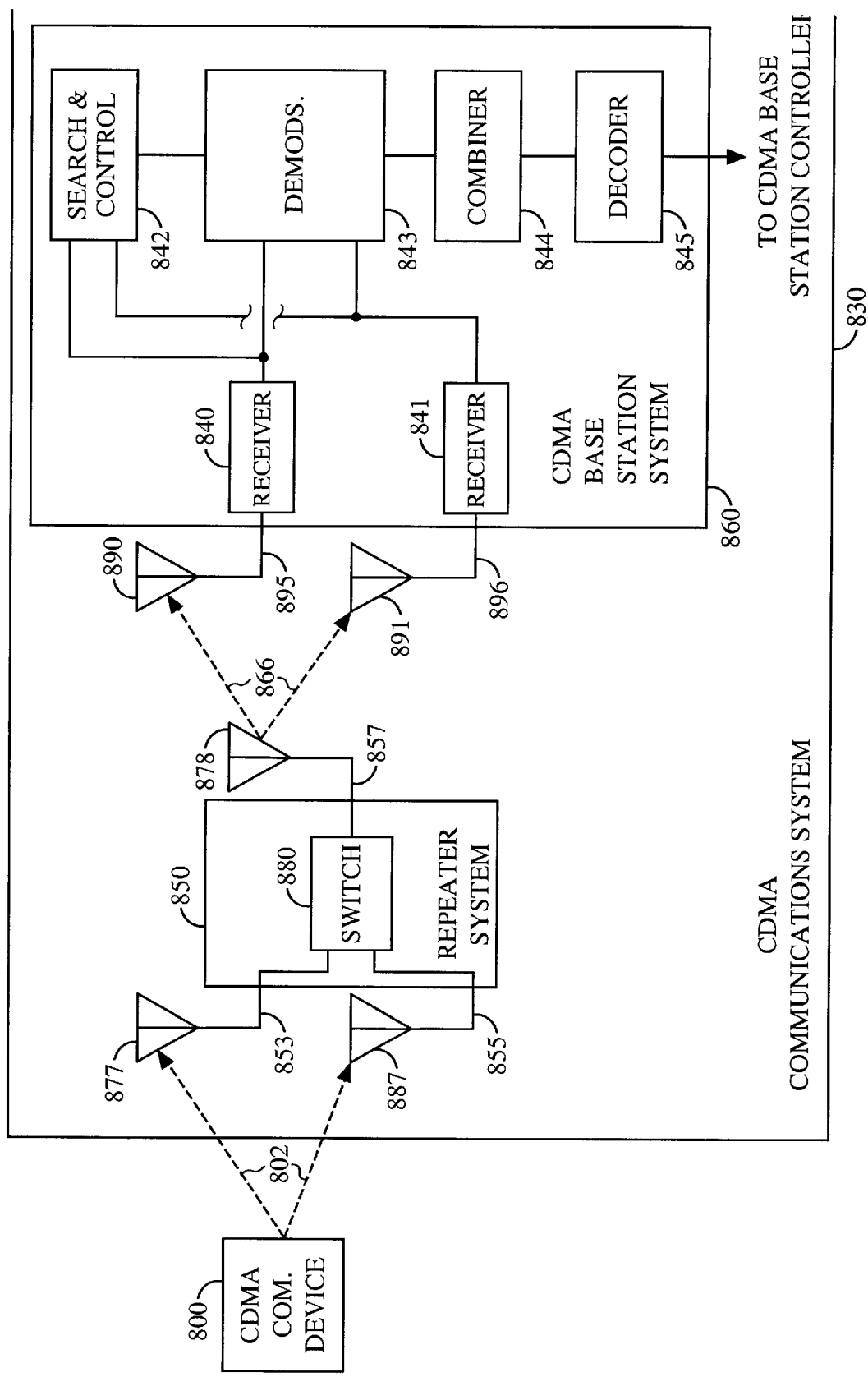
FIG. 8 is a block diagram of a CDMA communications system in an embodiment of the invention.

CDMA System Configuration and Operation—FIG. 8

FIG. 8 depicts a CDMA communications system 830 that is configured and operates in accord with the present invention. The CDMA communications system 830 is comprised of a wireless repeater system 850 and a CDMA base station system 860. The wireless repeater system 850 includes a switch 880 and is operationally coupled to wireless antennas 877, 878, and 887. The CDMA base station system 860 is comprised of receivers 840 and 841, search and control 842, demodulators 843, combiner 844, and decoder 845. The CDMA base station system 860 is operationally coupled to wireless antennas 890 and 891.

The components on FIG. 8 are conventional, but they have not been combined to operate in accord with the invention. Those skilled in the art are aware that there are numerous other components and configurations that could be used for the CDMA communications system 830 of the present invention, and that the invention is not restricted to the components and configuration depicted on FIG. 8.

In operation, the communications device 800 transmits the wireless signal 802 to the wireless repeater system 850. The wireless repeater system 850 receives a version 853 of the wireless signal 802 using the antenna 877. The repeater system 850 also receives a version 855 of the wireless signal 802 using the antenna 887. The wireless repeater system 850 typically amplifies the versions 853 and 855 and then transfers them to the switch 880.

The switch 880 switches between the versions 853 and 855 to generate a composite version 857 of the versions 853 and 855 which are all versions of the wireless signal 802. The switching rate should be between 800 Hz and 1 GHz and should be transparent to the processing at the CDMA base station system 860. Typically, the switching rate should be several times per chip period, such as 4 MHz. The switching rate should also be at a rate that is several times per voice frame so error correction circuitry at the base station system 860 would obtain the result of both of the antennas 877 and 887 several times per voice frame. The switching should not be instantaneous, but should transition between the versions 853 and 855 in such a manner as to prevent spectral growth due to the switching operation.

The wireless repeater system 850 typically amplifies the composite version 857 and transfers it to the antenna 878 for transmission. The antenna 878 transmits a version 866 of the wireless signal 802 to the CDMA base station 860. The version 866 is a wireless signal that is based on the composite version 857. The repeater system 850 operates in a reciprocal fashion for wireless signals that are received by the antenna 878 and that are transmitted by the antennas 877 and 887, except that switching is not required.

The antennas 890 and 891 typically both receive the version 866, although it is not required that both antennas 890 and 891 receive the version 866. For example, the version 866 may be intentionally directed away from the antenna 891, or may experience interference that prevents reception at the antenna 891. The antenna 890 provides a version 895 of the wireless signal 802 to the receiver 840. The antenna 891 provides a version 896 of the wireless signal 802 to the receiver 841. Both versions 895 and 896 are based on the version 866.

The receivers 840 and 841 down-convert and digitize the versions 895 and 896 respectively. The receivers 840 and 841 provide their respective signals to both the search and control 842 and the demodulators 843. The search and control 842 uses a Pseudo-random Number (PN) code to detect the arrival times of the various multipath copies included within the versions 895 and 896. The arrival times are provided to the demodulators 843 where the multipath copies are identified and processed using PN coding and Walsh coding. The demodulators 843 provide soft decision data to the combiner 844 based on the processing of the versions 895 and 896. The combiner combines the soft decision data; and provides it to the decoder 845. The decoder 845 decodes the soft decision data, typically with a trellis or Viterbi decoding process, to generate a signal with the user information in the original wireless signal 802 from the CDMA communications device 800. This signal is typically transferred to the CDMA base station controller.

Figure 9:
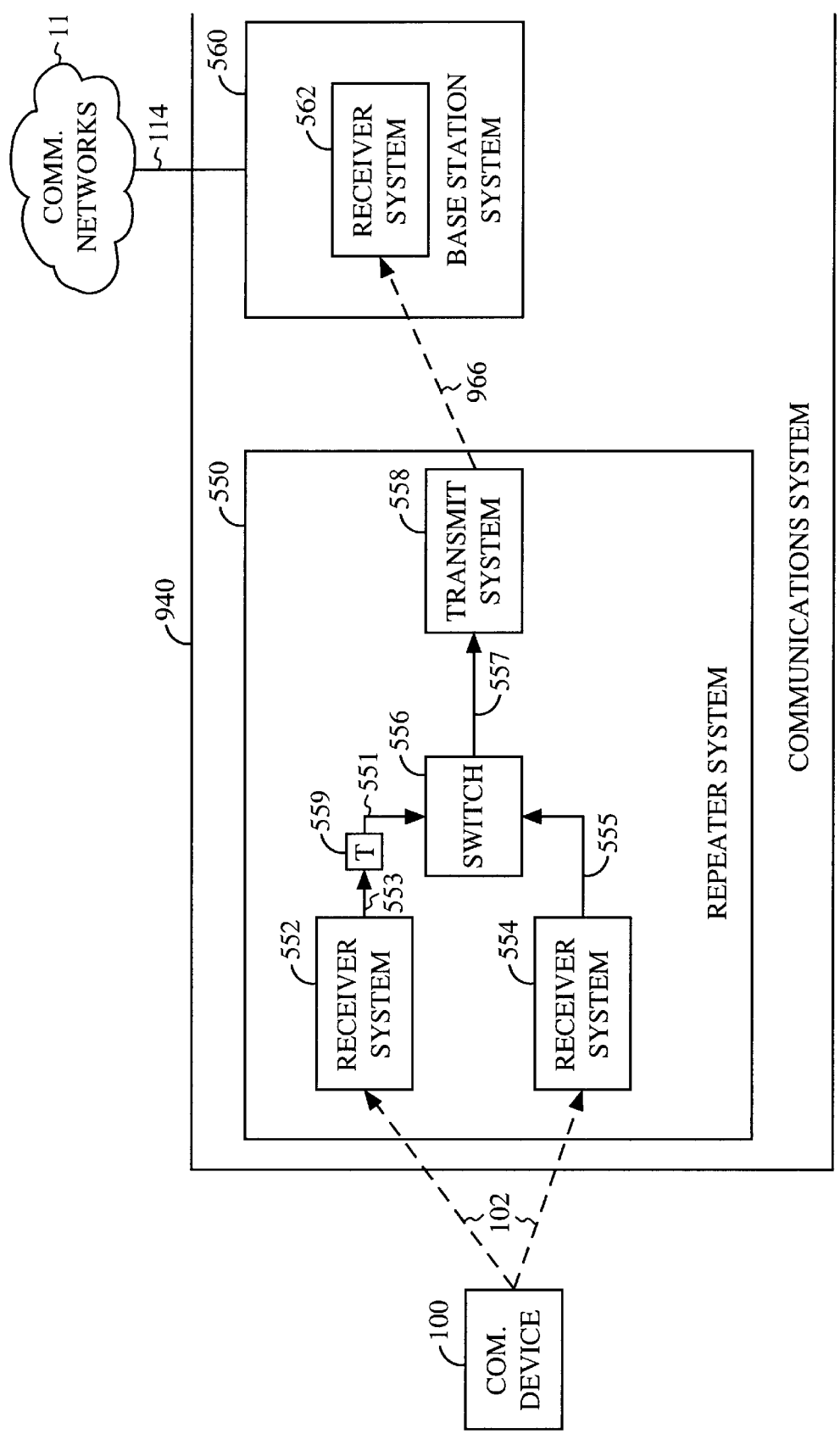
FIGS. 9–10 are block diagrams of alternative communications systems in some embodiments of the invention.
Figure 10:
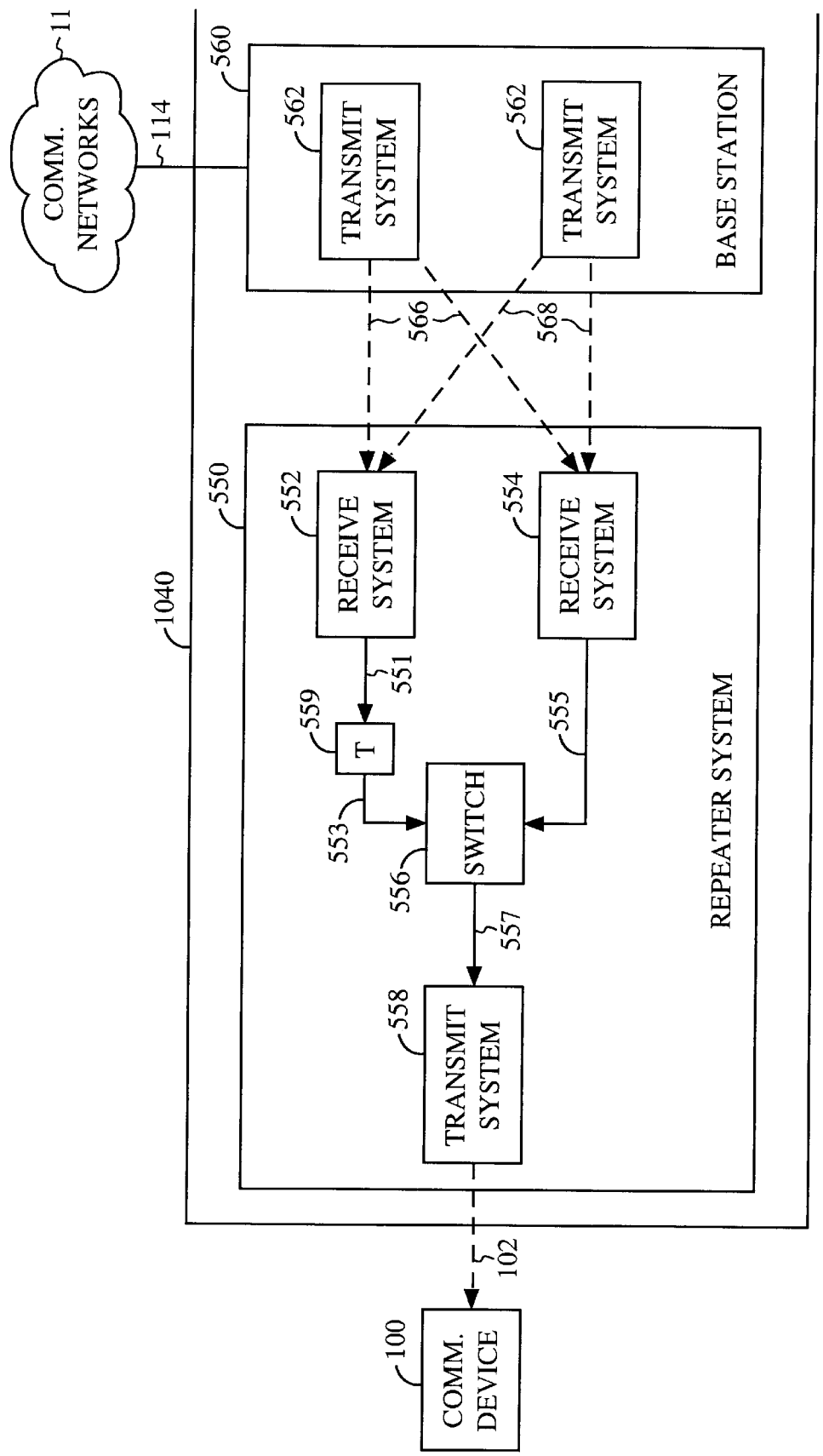

Additional System Configurations—FIGS. 9–10

FIG. 9 depicts a wireless communications system 940. The wireless communications system 940 is configured and operates like the wireless communications system 540 of FIG. 5 with a few modifications. A time delay circuit 559 is inserted in between the receiver system 552 and the switch 556. In addition, the interface between the repeater system 550 and the base station system 560 is a cable connection 966.

The time delay circuit 559 introduces a time delay into the version 553 of the wireless signal 102. The time delay circuit 559 is a conventional component. In CDMA systems, the time delay should be at least as long as one chip for the pseudo-random spreading codes used for demodulation, and is preferably 2–3 chips long. Chips and their duration are well known in CDMA. The time delay adds time diversity to the communications system 940.

The transmit system 558 in the repeater system 550 is connected to the receiver system 562 in the base station system 560 by a cable connection 966. The systems 558 and 562 include conventional cable connection interfaces. The cable connection 966 transports a version of the wireless signal that is based on the composite signal 557. The connection 966 could be a conventional connection. The cable connection 966 might use an analog or digital protocol at various speeds.

FIG. 10 depicts a wireless communications system 1040. The wireless communications system 1040 is configured and operates like the wireless communications system 540 of FIG. 5, except that the system 1040 is configured to operate on the forward link in a reciprocal fashion from system 540. The wireless communications system 1040 also includes the time delay circuit 559 in between the receiver system 552 and the switch 556.

In operation, the repeater system 540 receives multiple versions 566 and 568 of the wireless signal from the base station. The repeater system 550 receives a version 551 using the receiver system 552. The repeater system 550 also receives a version 555 using the receiver system 554. The receiver system 552 provides the version 551 to time delay circuit 559. The time delay circuit introduces a time delay and provides the time-delayed version 553 to the switch 556. The receiver system 554 provides the version 555 to the switch 556. The switch 556 switches between the time-delayed version 553 and the version 555 to generate a composite version 557. The switch 557 provides the composite version 557 to the transmitter system 558. The transmitter system 558 transmits a version 102 to the communications device 100. The version 102 is a wireless signal that is based on the composite version 557 of the wireless signals 556 and 558.

The components and operations described with respect to FIGS. 6–10 could be adapted from the components and operations described with respect to FIG. 5. Those skilled in the art recognize that the systems depicted in FIGS. 5–10 have been simplified for reasons of clarity, and that such systems include numerous other conventional components.

An antenna system is described in U.S. Pat. No. 5,577,265, entitled "Antenna System For Multi-Path Diversity In An Indoor Microcellular Communication System", by Charles E. Wheatley III, issued on Nov. 19, 1996, assigned to Qualcomm, Inc., and that is hereby incorporated by reference into the present application. A CDMA system is described U.S. patent application Ser. No. 08/941,147, entitled "Polarization Enhanced CDMA Communications System" by Kenneth R. Baker, filed on Sep. 30, 1997, assigned to Qualcomm, Inc., and that is hereby incorporated by reference into the present application. A repeater system using polarization diversity is described in a United States Patent Application entitled "Wireless Repeater Using Polarization Diversity In A Wireless Communications System", by Kenneth R. Baker, filed on the same date as the present application, assigned to Qualcomm, Inc., and that is hereby incorporated by reference into the present application. A repeater system using time diversity is described in a United States Patent Application entitled "Wireless Repeater Using Time Diversity In A Wireless Communications System", by Kenneth R. Baker and Richard Dean, filed on the same date as the present application, assigned to Qualcomm, Inc., and that is hereby incorporated by reference into the present application.

SUMMARY

In a distinct advance in the art, a switching capability is added to the wireless repeater to provide improve diversity between the repeater and the base station. The repeater does not sum the diverse versions of the wireless signal received by the repeater, but switches between the diverse versions to generate a composite version of the wireless signal. The composite version is more diverse than the summed version used in prior systems. The repeater transmits the composite version of the wireless signal to the base station. If desired, the base station can use receive diversity to receive the composite version.

The improved diversity increases the reliability of the system. Improved diversity also minimizes fading and lowers signal power requirements. Lower signal power increases the capacity and range of CDMA base stations. In addition to these advantages, the repeater does not incur the three-decibel SNR loss because it does not sum the diverse versions of the wireless signal. Also, reduced signal power lowers the cost of the user communications devices while increasing operational battery life.

The invention does not require diverse transmitters or power amplifiers in the repeater, or diverse receivers in the base station. The invention does not require special equipment to transmit and receive wireless signals using different polarizations. This reduces the cost of the system. It also makes the system operational in areas where the base station does not have receive diversity or equipment to receive wireless signals using different polarizations.

As mentioned above, signal power poses a concern for CDMA systems since it is directly related to the capacity and coverage of the CDMA system. The loss of diversity in a CDMA system typically results in higher signal power requirements that decrease the range of the CDMA system. The invention mitigates the loss of diversity in the repeater that is present in current CDMA systems. The invention increases CDMA system capacity by improving diversity and lowering the signal power requirements. The additional capacity could be used to handle additional simultaneous calls at the base station.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of providing wireless communications wherein a communications device transmits a wireless signal containing user information, the method comprising:

receiving a first version of the wireless signal into a repeater system using a first receiver system;

receiving a second version of the wireless signal into the repeater system using a second receiver system;

alternately switching, at a predetermined rate, between the fit version of the wireless signal and the second version of the wireless signal in the repeater system to generate a non-summed, composite version of the wireless signal, which non-summed composite version includes multiplexed portions of both the first and second version; and transmitting the non-summed composite version of the wireless signal from the repeater system.

2. The method of claim 1 further comprising receiving and processing the non-summed, composite version of the wireless signal in a base station system to generate a communications signal containing the user information.

3. The method of claim 2 further comprising transferring the communications signal to a communications network.

4. The method of claim 1 wherein the wireless signal is a Code Division Multiple Access signal.

5. The method of claim 1 further comprising introducing a time delay into the first version.

6. The method of claim 5 wherein the time delay is at least one chip in duration.

7. The method of claim 1 further comprising:

receiving two versions of another wireless signal into the repeater system;

switching between the two versions to generate another non-summed, composite version of the other wireless signal;

transmitting the non-summed, composite version of the other wireless signal from the repeater system to the communications device.

8. The method of claim 7 further comprising introducing a time delay into one of the two versions of the other wireless signal.

9. A system for wireless communications wherein a communications device transmits a wireless signal containing user information, the system comprising:

a repeater system that is operational to receive a firs version of the wireless signal using a first receiver system, to receive a second version of the wireless signal using a second receiver system, to alternately switch at a predetermined rate between the first version of the wireless signal and the second version of the wireless signal to generate a non-summed, composite version of the wireless signal, which non-summed, composite version includes multiplexed portions of both the first and second version, and to transmit the non-summed, composite version of the wireless signal; and a base station system that is operational to receive the non-summed, composite version of the wireless signal and to process the non-summed, composite version to generate a communications signal containing the user information.

10. The system of claim 9 wherein the wireless signal is a Code Division Multiple Access signal.

11. The system of claim 9 wherein the repeater system is further operational to introduce a time delay into the first version.

12. The system of claim 9 wherein the time delay is at least one chip in duration.

13. The system of claim 9 wherein the repeater system is further operational to receive two versions of another wires signal, to switch between the two versions to generate another non-summed, composite version of the other wireless signal, and to transmit the non-summed, composite version of the other wireless signal to the communications device.

14. The system of claim 9 wherein the repeater system is further operational to introduce a time delay into one of the two versions of the other wireless signal.

15. A repeater system for wireless communications wherein a communications device transmits a wireless signal, the repeater system comprising:

a first receiver system that is operational to receive a first version of the wireless signal;

a second receiver system that is operational to receive a second version of the wireless signal;

a switching system that is operationally coupled to the first receiver system and to the second receiver system and that is operational to alternately switch between the first version of the wireless signal and the second version of the wireless signal to generate a non-summed, composite version of the wireless signal, which non-summed, composite version includes multiplexed portions of both the first and second version; and a transmitter system that is operationally coupled to the switching system and that is operational to transmit the non-summed, composite version of the wireless signal.

16. The repeater system of claim 15 wherein the wireless signal is a Code Division Multiple Access signal.

17. A method of providing wireless communications wherein a communications device transmits a wireless signal containing user information, the method comprising:

receiving a first version of the wireless signal into a repeater system using a first receiver system;

receiving a second version of the wireless signal into the repeater system using a second receiver system;

without decoding for bit error rate, alternately switching, at a predetermined rate, between the first version of the wireless signal and the second version of the wireless signal in the repeater system to generate a non-summed, composite version of the wireless signal; and transmitting the non-summed, composite version of the wireless signal from the repeater system.

18. A system for wireless communications wherein a communications device transmits a wireless signal containing user information, the system comprising:

a repeater system that is operational to receive a first version of the wireless signal using a first receiver system, to receive a second version of the wireless signal using a, second receiver system, to alternately switch at a predetermined rate, between the first version of the wireless signal and the second version of the wireless signal to generate a non-summed, composite version of the wireless signal, which non-summed, composite version is generated without decoding for bit error rate, and to transmit the non-summed, composite version of the wireless signal; and a base station system that is operational to receive the non-summed, composite version of the wireless signal and to process the non-summed, composite version to generate a communications signal containing the user information.

19. A repeater system for wireless communications wherein a communications device transmits a wireless signal, the repeater system comprising:

a first receiver system that is operational to receive a first version of the wireless signal;

a second receiver system that is operational to receive a second version of the wireless signal;

a switching system that is operationally coupled to the first receiver system and to the second receiver system and that is operational to alternately switch between the first version of the wireless signal and the second version of the wireless signal to generate a non-summed, composite version of the wireless signal, which non-summed, composite version is generated without decoding for bit error rate; and a transmitter system that is operationally coupled to the switching system and that is operational to transmit the non-summed, composite version of the wireless signal.

* * * * *